April 15, 1941.
L. F. NISSEN
2,238,127
FISHING ROD SUPPORT
Filed March 9, 1939
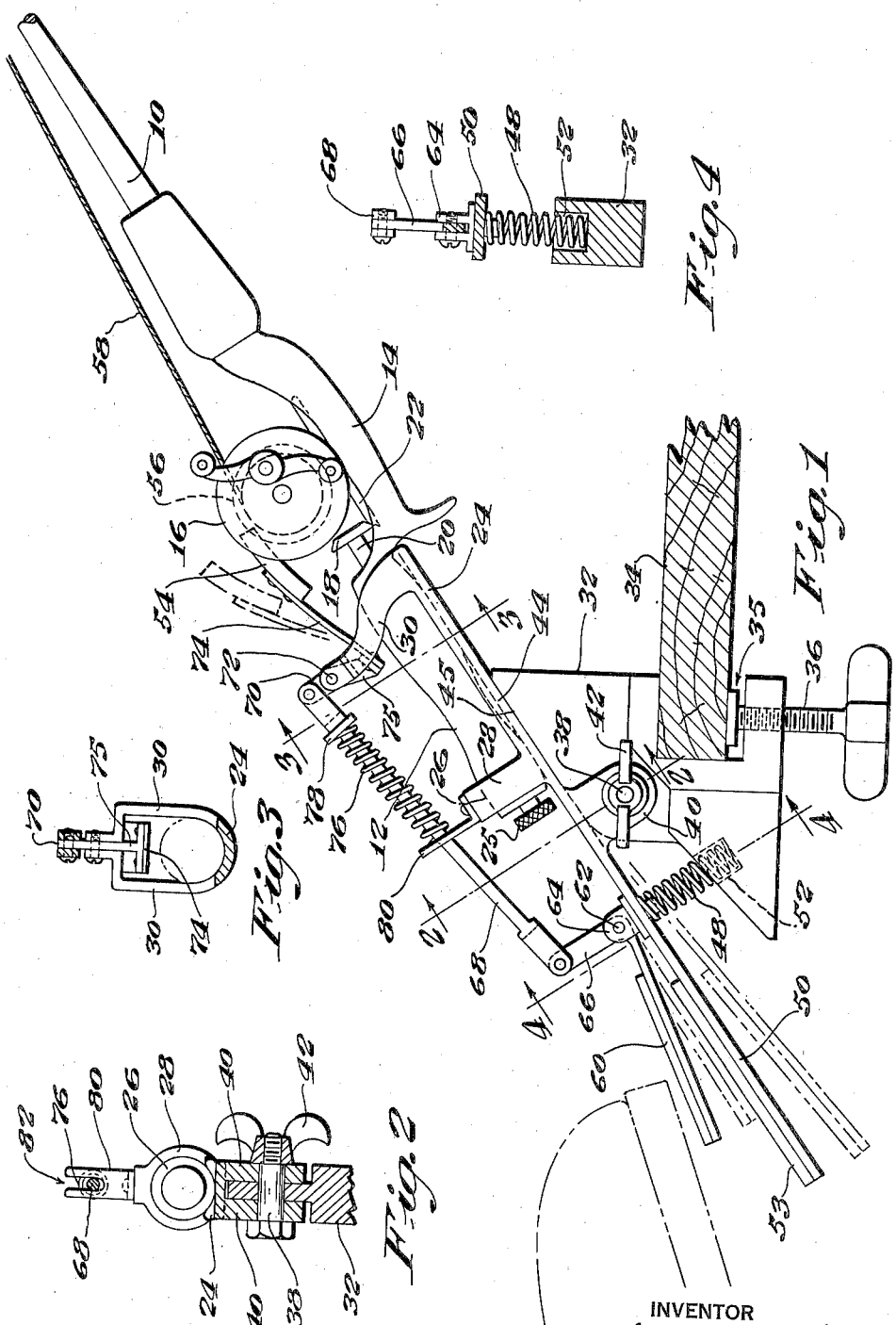
INVENTOR
BY Laurence F. Nissen
J. Stanley Churchill.
ATTORNEY Patented Apr. 15, 1941

2,238,127

UNITED STATES PATENT OFFICE 2,238,127

FISHING ROD SUPPORT

Laurence F. Nissen, Dorchester, Mass.

Application March 9, 1939, Serial No. 260,770

7 Claims. (Cl. 43—4)

This invention relates to a fishing rod support.

One object of the invention is to provide a novel fishing rod support capable of being attached to the seat or other portion of a boat and of being pivotally moved by the foot to cause the rod supported thereby to be rapidly elevated whereby to hook a fish when a strike is obtained and thereby permit the fisherman to continue and rowing the boat and retain grasp of the oars.

A further object of the invention is to provide a novel and improved fishing rod support of the character above specified having further provision for controlling the operation of the reel by the fisherman's foot.

With these general objects in view and such others as may hereinafter appear, the invention consists in the fishing rod support and in the various other structures, arrangements and combinations of parts hereinafter described and particularly defined in the claims at the end of this specification.

In the drawing which illustrates the preferred embodiment of the invention, Fig. 1 is a side elevation of the support with a fishing rod in place and clamped upon the seat of a rowboat; and Figs. 2, 3 and 4, are cross-sectional views taken on the lines 2—2, 3—3 and 4—4 respectively.

In general the present invention contemplates a novel fishing rod support which may be used with advantage by a fisherman trolling in a rowboat and in which provision is made for controlling the rod by means of foot pedals to permit the fisherman to continue rowing the boat during the trolling operation. To this end, the support is pivotally mounted to permit the support to be rocked to raise the rod quickly when the line is struck by the fish. Provision is also made in the preferred embodiment of the invention for operating the reel brake by means of a foot pedal during the trolling operation.

Referring now to the drawing, 10 represents a fishing rod of any usual or preferred construction and having a handle 12 and provided with a portion 14 in which the reel 16 is received. The reel 16 may be clamped in the receiving portion in any usual manner such as by the bevelled end 18 of a screw 20 which extends through the handle 12 and which may be rotated to force the bevelled end against the reel base 22, by turning the knurled end 25 of the screw.

As herein shown, the handle 12 is received in a pivotally mounted supporting member 24, the end of the handle 26 being arranged to fit snugly into a socket 28 provided on the member 24, the forward part of the handle resting loosely between the arms 30 extending from the receiving member. With this arrangement, the handle may be easily and quickly inserted or withdrawn when the occasion arises.

The supporting member 24 is pivotally mounted in a bracket 32 which is arranged to be clamped to the seat 34 or other portion of a boat. As illustrated herein, the bracket 32 is provided with a cut out portion 35 adapted to fit over the edge of the seat 34, and a clamp screw 36 may be tightened up against the underside of the seat to firmly fix the unit in position. The pivotal mounting comprises a stud 38 which extends through lugs 40 depending from the member 24 and through the bracket 32 being held in position by a thumb nut 42 as shown in Fig. 2.

As illustrated herein, the forward portion 44 of the member 24 rests against an angularly cut surface 45 of the bracket 32 to dispose the rod at the most efficient or convenient angle for fishing and particularly for trolling from or over the stern of the boat. The member 24 is normally retained in this position by a compression spring 48 which bears against the underside of an extended portion 50 of the member 24, the lower end of the spring being supported in a socket 52 provided in the bracket 32. The extended portion 50 as herein shown, is provided with a pad 53 and comprises in effect, a foot pedal whereby, in operation, the member 24 may be rocked on its pivot 38 against the tension of the spring 48, by the foot of the fisherman to raise the rod quickly when it is desired to hook the fish or when a strike is made and while the fisherman is engaged in rowing the boat.

Provision is also made in the preferred embodiment of the invention for braking and releasing the reel 16 during the trolling operation and which is adapted to be controlled by the foot of the fisherman while he is engaged in rowing the boat. As herein shown, a braking member 54 is normally disposed in operative engagement with the reel braking drum 56, and is arranged to be rocked out of operative engagement to release the line 58 by depressing a foot pedal 60. The foot pedal 60 comprises one arm of a bell-crank pivotally mounted at 62 in a member 64 secured to the upper surface of the extension 50 of the member 24 see Fig. 4. The other arm 66 of the bell-crank is connected by a link 68 to one arm 70 of a two-armed lever pivotally mounted at 72 between the upwardly extending arms 30 which are bent inwardly as illustrated in Fig. 3. The braking member 54, which may be of suitable braking material such as hard fibre, is affixed to a piece of spring steel 74 which is attached to the second arm 75 of the two-armed lever. The braking member 54 is normally retained in braking engagement with the reel drum 56 by a coil spring 76 which fits over the link 68 and which is supported between a collar 78 on the link and angle bracket 80 mounted on the top of the socket 28. The bracket 80 is provided with a slotted portion 82, see Fig. 2, through which the link 68 is arranged to pass. With this construction the braking member 54 may be rocked from operative position to the position illustrated in dotted lines in Fig. 1 by simply depressing the foot pedal 60.

From the description thus far it will be observed that the present fishing rod support may be used with advantage in trolling and when mounted upon the seat facing the fisherman the latter may continue to row and retain grasp of the oars while operating the fishing rod to hook the fish when a strike is obtained and thereafter to release the reel and permit the line to pay out. The present fishing rod support avoids the difficulty which has heretofore been experienced by fishermen while trolling and resulting from releasing the oars and grasping the fishing pole when a strike is obtained. In many instances the oars are lost overboard and considerable time elapses between the strike and the operation of hooking the fish so that oftentimes the fish are lost which would otherwise be hooked.

While the preferred embodiment of the invention has been herein illustrated and described as embodied in a fishing rod support, it will be understood that the invention may be embodied in other forms within the scope of the following claims.

Having thus described the invention, what is claimed is:

1. A fishing rod support comprising a rigid rod supporting member adapted to receive and clamp the handle of a fishing rod in a normally inclined position, a second member capable of being clamped to the seat or other portion of the boat and upon which the rod supporting member is pivoted to permit the rod supporting member to be rocked upwardly when the rear portion of the rod supporting member is engaged by the foot of the fisherman, said second member cooperating with the rod supporting member to prevent the latter from being rocked downwardly beyond its normal position.

2. A fishing rod support comprising a rigid rod supporting member adapted to receive and clamp the handle of a fishing rod in a normally inclined position, a second member capable of being clamped to the seat or other portion of the boat and upon which the rod supporting member is pivoted at a point mediate the ends thereof to be rocked upwardly when the rear portion of the rod supporting member is depressed by the foot of the fisherman, said second member cooperating with the rod supporting member to prevent the latter from being rocked downwardly beyond its normal position.

3. A fishing rod support comprising a rigid rod supporting member adapted to receive and clamp the handle of a fishing rod in a normally inclined position, a second member capable of being clamped to the seat or other portion of the boat and upon which the rod supporting member is pivoted to permit the rod supporting member to be rocked upwardly when the rear portion of the rod supporting member is engaged by the foot of the fisherman, said second member cooperating with the rod supporting member to prevent the latter from being rocked downwardly beyond its normal position, and foot operated reel braking mechanism mounted upon the rod supporting member to form a unit therewith.

4. A fishing rod support comprising a rigid rod supporting member adapted to receive and clamp the handle of a fishing rod in a normally inclined position, a second member capable of being clamped to the seat or other portion of the boat and upon which the rod supporting member is pivoted at a point mediate the ends thereof to be rocked upwardly when the rear portion of the rod supporting member is depressed by the foot of the fisherman, said second member cooperating with the rod supporting member to prevent the latter from being rocked downwardly beyond its normal position, and foot operated reel braking mechanism mounted upon the rod supporting member to form a unit therewith.

5. A fishing rod support comprising a rigid rod supporting member having provision for the reception and clamping of the handle of the fishing rod to support the rod in a normally inclined position, a second member capable of being clamped to the seat or other portion of the boat upon which the rod supporting member is pivoted, the end of the rod supporting member remote from the fishing pole forming a foot treadle adapted to be depressed by the foot of a fisherman whereby to rock the fishing rod upwardly to hook the fish and reel braking mechanism mounted upon the rod supporting member and arranged to normally exert a braking effect upon the reel and including a second foot treadle adapted, upon engagement by the foot, to effect release of the reel whereby to permit the line to pay out.

6. A fishing rod support comprising a rigid rod supporting member adapted to receive and clamp the handle of a fishing rod in a normally inclined position, a second member capable of being clamped to the seat or other portion of the boat and upon which the rod supporting member is pivoted to permit the rod supporting member to be rocked upwardly when the rear portion of the rod supporting member is engaged by the foot of the fisherman, said second member cooperating with the rod supporting member to positively prevent the latter from being rocked downwardly beyond its normal position, and means for returning the rod and its pivotal supporting member to its normally inclined position when the foot is removed from the rear portion thereof.

7. A fishing rod support comprising a rigid rod supporting member adapted to receive and clamp the handle of a fishing rod in a normally inclined position, a second member capable of being clamped to the seat or other portion of the boat and upon which the rod supporting member is pivoted at a point mediate the ends thereof to be rocked upwardly when the rear portion of the rod supporting member is depressed by the foot of the fisherman, said second member cooperating with the rod supporting member to positively prevent the latter from being rocked downwardly beyond its normal position, and means for returning the rod and its pivotal supporting member to its normally inclined position when the foot is removed from the rear portion thereof.

LAURENCE F. NISSEN.